(12) United States Patent
Dohmoto et al.

(10) Patent No.: US 6,638,989 B2
(45) Date of Patent: Oct. 28, 2003

(54) METHOD OF PREPARING POLYURETHANE-MODIFIED POLYISOCYANURATE FOAM

(75) Inventors: Yoshiyuki Dohmoto, Wakayama-Pref. (JP); Masayuki Fujidai, Sanda (JP)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/991,076

(22) Filed: Nov. 16, 2001

(65) Prior Publication Data

US 2002/0120029 A1 Aug. 29, 2002

(30) Foreign Application Priority Data

Nov. 20, 2000 (JP) ........................................ 2000-352666

(51) Int. Cl.$^7$ ................................................ C08G 18/10
(52) U.S. Cl. ....................... 521/159; 521/130; 521/131; 521/170; 521/172; 521/173; 521/174
(58) Field of Search ................................. 521/130, 131, 521/159, 170, 172, 173, 174

(56) References Cited

U.S. PATENT DOCUMENTS 5,494,942 A * 2/1996 Ottens et al. ................ 521/159
6,245,825 B1 * 6/2001 Bleys .......................... 521/137

* cited by examiner

Primary Examiner—John M. Cooney, Jr.
(74) Attorney, Agent, or Firm—Joseph C. Gil; Lyndanne M. Whalen

(57) ABSTRACT

Rigid foams having excellent compression strength, dimensional stability, flame retardance and adhesion are produced by reacting an active hydrogen compound having at least two functionalities with a polyisocyanate compound in the presence of a catalyst and a blowing agent comprising either water alone or a mixture of water and a low boiling compound, wherein (1) the polyisocyanate compound is a prepolymer obtained by reacting a polymeric MDI with 5 to 30% by weight, based on the polymeric MDI, of a polyether polyol and/or polyester polyol having a hydroxyl value of at most 100 mg KOH/g, and (2) the number of isocyanate groups in the polyisocyanate compound is at least 1.5 times by mole as large as the number of active hydrogen atoms in the active hydrogen compound and water.

8 Claims, No Drawings

METHOD OF PREPARING POLYURETHANE-MODIFIED POLYISOCYANURATE FOAM

The present invention relates to a method of preparing a rigid foam made of polyurethane-modified polyisocyanurate.

There is increasing demand for improvements in flame retardancy of a rigid polyurethane foam. As a procedure to deal therewith, there is a method in which an isocyanate is used in excess to form a rigid foam containing an isocyanurate compound in a large amount. However, as the amount of the isocyanurate compound is increased, the resulting foam becomes more brittle than usual polyurethane foam, and when used for producing a composite material having a surface material such as iron plate, the foam suffers from the problem of poor adhesion thereof to the surface material.

Conventional procedures taken for solving this problem involve increasing the reaction temperature; decreasing the content of water in compounded polyols while increasing a blowing agent consisting of a low-boiling compound; increasing a catalyst for producing an isocyanurate; or using polyols having a relatively high molecular weight. However, because of limitations such as other physical properties required for the foam and conditions for producing the foam, there was the problem that satisfactory adhesion could not be obtained particularly when e.g. polyester polyols are mainly used as the active hydrogen compound.

Polyols generally having a hydroxy value of at least 150 mg KOH/g, particularly at least 250 mg KOH/g, are used to produce a rigid foam having high compression strength and excellent dimensional stability. When a large amount of polyols having a hydroxy value of at most 100 mg KOH/g are used for the rigid foam having excellent thermal insulation performance and a high ratio of closed cell, there is the problem of poor dimensional stability, high shrinkage, etc. On the other hand, a large amount of polyols having a low hydroxy value can be used for the foam having a low ratio of closed cell or for the foam having high density without any problem of dimensional stability, but thermal insulation performance is deteriorated. Further, when high-molecular-weight polyols having a hydroxy value of at most 100 mg KOH/g are used partially for improvements in adhesion strength, etc., they tend to be separated owing to their poor compatibility with the polyols for a general rigid foam.

An object of the present invention is to produce a rigid foam which is excellent in compression strength, dimensional stability, flame retardancy and adhesion.

As a result of extensive study for achieving this object, the present inventors found that a polyester and/or a polyether polyol having a hydroxy value of at most 100 mg KOH/g is previously reacted with a polymeric MDI to form a prepolymer, and then this prepolymer is reacted with a formulated polyol to give a rigid foam excellent in compression strength, dimensional stability and flame retardancy, and also that when the amount of the polyol in the prepolymer is at least 5% by weight, the adhesion strength between the foam and a surface material is increased, and the present invention was thereby completed. The adhesion strength is increased with an increasing weight amount of the polyol in the prepolymer, but use of 30% by weight or more polyol in the prepolymer is not preferable because of a little increase in adhesion strength and the problem of poor dimensional stability, high shrinkage, etc.

The present invention relates to a method of preparing a polyurethane-modified polyisocyanurate foam, comprising reacting an active hydrogen compound having at least two functionalities with a polyisocyanate compound in the presence of a catalyst and a blowing agent comprising water alone or a mixture of water and a low-boiling compound, wherein:

(1) the polyisocyanate compound is a prepolymer obtained by reacting a polymeric MDI with 5 to 30% by weight, based on the polymeric MDI, of a polyether polyol and/or polyester polyol having a hydroxy value of at most 100 mg KOH/g, and (2) the number of isocyanate groups in the polyisocyanate compound is at least 1.5 times by mole as large as the number of active hydrogen atoms in the active hydrogen compound and water.

The polyisocyanate compound used in the present invention is a prepolymer obtained by reacting a polymeric MDI with a polyether polyol and/or polyester polyol having a hydroxy value of at most 100 mg KOH/g. The polymeric MDI is generally a mixture of diphenyl methane diisocyanate and polymethylene polyphenyl poly-isocyanate. The content of isocyanate groups in the polyisocyanate compound is generally from 28 to 33% by weight, particularly from 30 to 32% by weight. The hydroxy value of the polyether polyol and/or polyester polyol may be, for example, at most 100 mg KOH/g, particularly from 23 to 80 mg KOH/g. The amount of the polyether polyol and/or polyester polyol is from 5 to 30% by weight, particularly from 5 to 20% by weight, based on the polymeric MDI.

The polyether polyol used to make the prepolymer includes hydroxyl group-containing compounds such as ethylene glycol, propylene glycol, diethylene glycol, glycerin, trimethylol propane, pentaerythritol, sorbitol and sucrose; and hydroxyl group-containing compounds having an alkylene oxide such as ethylene oxide or propylene oxide added to an amino group-containing compound such as diaminotoluene.

The polyester polyol used to make the prepolymer includes polyester polyols produced by a known method using at least one compound selected from ethylene glycol, propylene glycol, diethylene glycol, glycerin, trimethylol propane, pentaerythritol and sorbitol, and at least one compound containing at least two carboxyl groups, such as malonic acid, maleic acid, succinic acid, adipic acid, tartaric acid, pimelic acid, sebacic acid, oxalic acid, phthalic acid, terephthalic acid, trimellitic acid and polycarboxylic acid.

Examples of the active hydrogen compound having at least two functionalities, which is reacted with the polyisocyanate compound, include hydroxy group-containing compounds such as ethylene glycol, propylene glycol, diethylene glycol, glycerin, trimethylol propane, pentaerythritol, sorbitol and sucrose; amino group- and hydroxy group-containing compounds such as triethanolamine and diethanolamine; amino group-containing compounds such as ethylene diamine and diaminotoluene; and polyether polyols having at least two hydroxy groups in the molecule having an alkylene oxide such as ethylene oxide or propylene oxide added to e.g. a Mannich base compound formed by reacting phenol or its derivative, an alkanol amine and formaldehyde.

Further, examples of the active hydrogen compound include polyester polyols produced in a known method by using at least one compound selected from ethylene glycol, propylene glycol, diethylene glycol, glycerin, trimethylol propane, penta-erythritol and sorbitol, and at least one compound containing at least two carboxyl groups, such as malonic acid, maleic acid, succinic acid, adipic acid, tartaric acid, pimelic acid, sebacic acid, oxalic acid, phthalic acid, terephthalic acid, trimellitic acid and polycarboxylic acid. Further, polyester polyols manufactured by an ester exchange reaction between a high-molecular polyalkylene terephthalate polymer and a low-molecular diol such as ethylene glycol, propylene glycol, diethylene glycol, glycerin and trimethylol propane are also effective.

In the method of the present invention, a catalyst effective for conversion into isocyanurate and a catalyst effective for conversion into urethane, known as a catalyst in the chemistry of urethane, are used in order that isocyanate groups are used in excess over active hydrogen atoms (i.e. hydrogen atoms reactive with the isocyanate) to form an isocyanurate compound. The catalyst effective for conversion into isocyanurate includes e.g. organometallic compounds such as potassium acetate and potassium octanoate; quaternary ammonium salts such as DABCO TMR; and triazine compounds such as POLYCAT 41. The catalyst effective for conversion into urethane includes e.g. tertiary amines such as N,N-dimethylcyclohexylamine, N,N,N',N'-tetramethyl ethylene diamine, bis(N,N-dimethylaminoethyl) ether and pentamethyl diethylene triamine; and organometallic compounds such as dibutyltin dilaurate and lead octylate.

Water alone is used or water and a low-boiling compound in combination are used as the blowing agent. The low-boiling compound includes hydrocarbons such as isomers of butane, pentane and hexane; and low-boiling fluorine-containing compounds such as HFC-245, HFC-365 and HFC-134a, and these are used alone or in combination.

Additives such as surfactants (foam regulators), for example silicone-based foam stabilizers and flame-retardants can arbitrarily be used as the aids.

It is preferable that among the physical properties of the polyurethane-modified polyisocyanurate foam produced according to the present invention, a ratio of closed cell is at least 70%, and a density is at most 70 kg/m$^3$.

The rigid foam containing a large amount of the isocyanurate compound, which is obtained by the present invention, is excellent in the adhesion to a surface material such as an iron plate and useful as a thermal insulation panel applied to building materials, etc.

EXAMPLES

Hereinafter, the present invention is described in more detail by reference to the Examples and Comparative Examples.

The physical properties were evaluated according to the following measurement methods.

Compression Strength

The compression strength was measured according to JIS A 9511 (Method of measuring foamed plastic heat insulation materials).

Flexural Strength

The flexural strength was measured according to JIS A 9511 (Method of measuring foamed plastic heat insulation materials).

Adhesion Strength

An iron plate of 10 cm in width and 15 cm in length was placed on an upper or lower surface of a mold of 40 cm in width, 60 cm in length and 4.5 cm in thickness, and the reaction liquid was poured into the mold, then left for 1 day, and measured for the strength necessary for removing the iron plate in a longitudinal direction. The necessary minimum strength was expressed as the adhesion strength.

Ratio of Closed Cell

The Ratio of closed cell was measured according to ASTM D 2856 (Method B).

Thermal Conductivity

The thermal conductivity was measured according to JIS A 9511 (Method of measuring foamed plastic heat insulation materials).

Flammability

A foam of 25 mm in thickness was cut out and measured for its flammability (fume concentration, temperature-time area, and afterflame) according to JIS A 1321.

Examples 1 to 3

100 parts by weight of polymeric MDI (Sumidur 44V20 (NCO%; 31.5) manufactured by Sumitomo Bayer Urethane Co., Ltd.), 8 parts by weight of a polyether polyol with a hydroxy value of 56 mg KOH/g having propylene oxide and ethylene oxide added to glycerin, and 8 parts by weight of a polyester polyol with a hydroxy value of 56 mg KOH/g formed from phthalic anhydride and ethylene glycol were reacted under the condition of 80 deg. C. for 2 hours to prepare a polymeric MDI prepolymer (prepolymer A) having an isocyanate group content of 26% which was used as the isocyanate component.

As the polyol component, a mixture of a polyol, a flame-retardant (tris(beta-chloro) propyl phosphate (TCPP)), a foam stabilizer, a catalyst and a blowing agent shown in Table A was used. As the polyol, a polyester polyol (polyol A) having a hydroxy value of 250 mg KOH/g prepared from phthalic acid, ethylene glycol and diethylene glycol was used in Examples 1 and 2, and a polyester polyol (polyol B) having a hydroxy value of 200 mg KOH/g prepared from phthalic acid, ethylene glycol and diethylene glycol was used in Example 3.

As the surfactant, a silicone surfactant L-5420 manufactured by Nippon Unicar Co., Ltd. was used.

As the catalyst, N,N-dimethylcyclohexylamine (catalyst 1) and a solution (catalyst 2) consisting of 25 parts by weight of potassium acetate and 75 parts by weight of diethylene glycol were used.

As the blowing agent, a combination of cyclopentane and water was used in Example 1; a combination of HFC-365mfc (pentafluorobutane) and water was used in Example 2; and water alone was used in Example 3.

These components were compounded such that the number of isocyanate groups in the isocyanate component was at least 1.5 times by mole as large as active hydrogen atoms in the polyol and water as the polyol component. This ratio is shown as the isocyanate index [=(number of isocyanate groups)/(number of active hydrogens)×100] in Table A.

The isocyanate component and the polyol component were mixed with stirring for 8 to 10 seconds in a stirrer (number of revolutions: 4,500 rpm) and introduced into an aluminum mold (size: 600 mm in length×400 mm in width×45 mm in thickness) previously heated at 55 deg. C. having a colored steel plate attached as a surface material to a bottom force of said mold, and immediately covered with a top force also having the same colored steel plate attached thereto, and the mixture therein was foamed. After 5 minutes, the mixture was demolded to give a molded sandwich panel having a rigid isocyanurate foam as a core layer.

Various physical values of the molded sandwich panel were evaluated. The results are shown in Table A.

Comparative Example 1

Substantially the same procedure as in Example 1 was repeated except that the polymeric MDI (Sumidur 44V20 (NCO%; 31.5) manufactured by Sumitomo Bayer Urethane Co., Ltd.) was used as the isocyanate component. The results are shown in Table A.

Comparative Example 2

Substantially the same procedure as in Example 1 was repeated except using the polymeric MDI prepolymer (prepolymer B) having an isocyanate group content of 29%, prepared by reacting 100 parts by weight of the polymeric MDI (Sumidur 44V20 (NCO%; 31.5) manufactured by Sumitomo Bayer Urethane Co., Ltd.) at 80 deg. C. for 2 hours with 5 parts by weight of a polyester polyol having a hydroxy value of 315 mg KOH/g formed from phthalic anhydride and ethylene glycol. The results are shown in Table A.

TABLE A

|  | Example 1 | Example 2 | Example 3 | Comparative Example 1 | Comparative Example 2 |
|---|---|---|---|---|---|
| Polyol component | | | | | |
| Polyol A | 100 | 100 | | 100 | 100 |
| Polyol B | | | 100 | | |
| TCPP | 20 | 15 | 10 | 20 | 20 |
| Surfactant | 4 | 4 | 4 | 4 | 4 |
| Catalyst 1 | 1 | 1 | 1 | 1 | 1 |
| Catalyst 2 | 3 | 3 | 3 | 3 | 3 |
| Water | 1 | 1 | 5 | 1 | 1 |
| Cyclopentane | 19 | | | 15 | 17 |
| HFC-365 mfc | | 37 | | | |
| Isocyanate component | | | | | |
| Prepolymer A | 290 | 290 | 310 | | |
| Prepolymer B | | | | | 260 |
| Sumidur 44V20 | | | | 240 | |
| Isocyanate index | 300 | 300 | 200 | 300 | 300 |
| Physical properties of foam | | | | | |
| Whole(skin and core) density kg/m³ | 48.5 | 46.4 | 48.1 | 47.4 | 47.1 |
| Core density kg/m³ | 43.9 | 43.9 | 45.3 | 44.8 | 44.1 |
| Compression strength MPa | 0.15 | 0.19 | 0.19 | 0.19 | 0.19 |
| Flexural strength MPa | 0.54 | 0.58 | 0.63 | 0.67 | 0.61 |
| Adhesion strength (release) | | | | | |
| Upper face 0.1 N/10 cm | 4.5 | 4.5 | 3.8 | 0.2 | 0.2 |
| Lower face 0.1 N/10 cm | 3.8 | 3.6 | 3.5 | 0.2 | 0.2 |
| Ratio of closed cell % | 92 | 88 | 90 | 89 | 91 |
| Thermal conductivity W/mK | 0.0230 | 0.0220 | 0.0245 | 0.0235 | 0.0235 |
| Dimensional stability | | | | | |
| −30 deg. C. × 5 days | −0.3 | −0.8 | −0.4 | −0.5 | −0.3 |
| 70 deg. C. × 5 days | 1.5 | 0.6 | 4.8 | 1.3 | 1.8 |
| Flammability | | | | | |
| Fume concentration CA | 33 | 32 | 78 | 45 | 41 |
| Temperature × time area td theta | 95 | 68 | 154 | 95 | 97 |
| Afterflame sec | 22 | 49 | 50 | 49 | 58 |

As shown in the results in Table A, the rigid-foam sandwich panels made of the prepolymer of the present invention were satisfactory in respect of the adhesion strength between the rigid foam and the colored steel plate as the surface material, as compared with the rigid-foam sandwich panels in Comparative Examples 1 and 2.

According to the present invention, there can be produced a rigid foam excellent in compression strength, dimensional stability, flame retardancy and adhesion (particularly adhesion to a surface material such as metal).

What is claimed is:

1. A process for the production of a rigid polyurethane-modified polyisocyanurate foam comprising reacting
   a) a compound having at least two active hydrogen atoms with
   b) a polyisocyanate comprising a prepolymer which is a reaction product of
      (1) a polymeric MDI and
      (2) 5–30% by weight, based on total weight of polymeric MDI, of a polyether polyol and/or polyester polyol having a hydroxyl value no greater than 100 mg KOH/g in the presence of
   c) a catalyst and
   d) a blowing agent comprising (1) water or (2) a mixture of water and a low boiling compound in amounts such that at least 1.5 moles of isocyanate groups are present for each mole of active hydrogen atoms present in compound a) and in any water present.

2. The process of claim 1 in which the prepolymer has an isocyanate content of from 28–33%.

3. The process of claim 1 in which from 5 to 20% by weight polyether polyol and/or polyester polyol having a hydroxyl value of no greater than 100 mg KOH/g is used to produce the prepolymer.

4. The process of claim 1 in which the hydroxyl value of the polyether polyol and/or polyester polyol used to produce the prepolymer is from 23 to 80 mg KOH/g.

5. A rigid polyurethane-modified polyisocyanurate foam produced by the process of claim 1.

6. The rigid foam of claim 5 having a closed cell content of at least 70% and a density no greater than 70 kg/m$^3$.

7. An insulation panel produced from the rigid foam of claim 5.

8. An insulation panel produced from the rigid foam of claim 6.

* * * * *